A. McD. McAFEE.
MANUFACTURE OF ALUMINUM CHLORID.
APPLICATION FILED FEB. 12, 1914.
1,099,096.
Patented June 2, 1914.
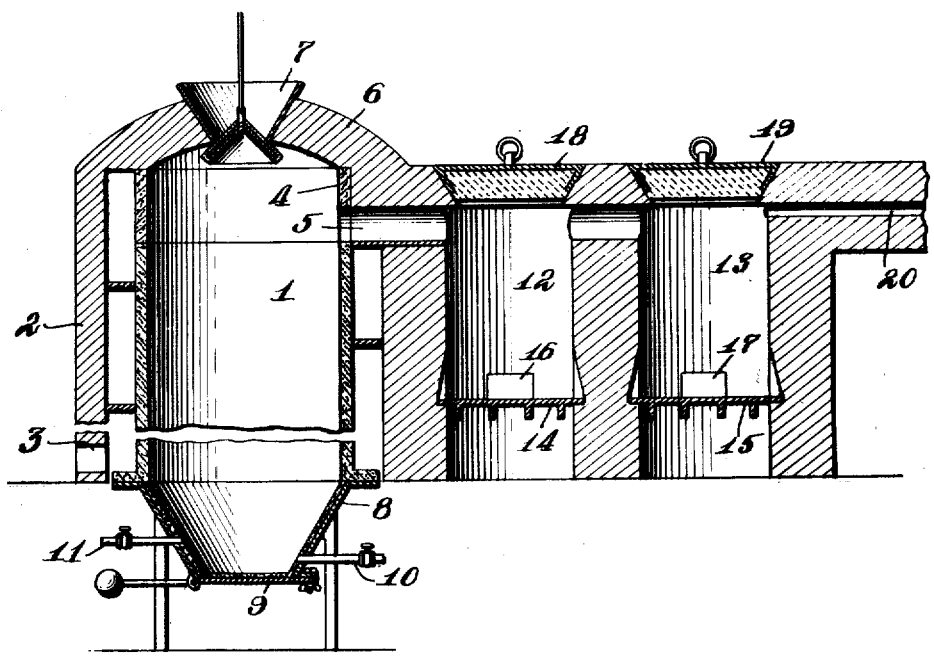

UNITED STATES PATENT OFFICE.

ALMER McDUFFIE McAFEE, OF BAYONNE, NEW JERSEY.

MANUFACTURE OF ALUMINUM CHLORID.

1,099,096. Specification of Letters Patent. Patented June 2, 1914.

Application filed February 12, 1914. Serial No. 818,285.

*To all whom it may concern:*

Be it known that I, ALMER McDUFFIE McAFEE, a citizen of the United States, residing at Bayonne, in the county of Hudson and State of New Jersey, have invented certain new and useful Improvements in the Manufacture of Aluminum Chlorid, of which the following is a specification.

This invention relates to the manufacture of aluminum chlorid; and it comprises a method of utilizing certain oily residual materials formed in the treatment of oils with aluminum chlorid or with substances capable of forming aluminum chlorid, such method comprising removing oil from such residues, bringing the oil-freed material to a high temperature and contacting therewith chlorin or chlorin-containing gas, to recover aluminum chlorid; all as more fully hereinafter set forth and as claimed.

Aluminum chlorid, and substances capable of forming aluminum chlorid, may be employed in treating various oils to produce useful catalytic effects therein; and particularly in treating mineral oils. I have elsewhere described and claimed one such process, for example, wherein I distil crude petroleum, petroleum distillates or residues in the presence of aluminum chlorid, refluxing unchanged oil back into the still, and producing a conversion into gasolene or gasolene and kerosene, as the case may be. Or in lieu of using aluminum chlorid in treating oils, I may employ substances capable of forming aluminum chlorid, such as hydrochloric acid or chlorin together with alumina (bauxite) or metallic aluminum. In another such process, I warm lubricating oils with aluminum chlorid to produce a decolorizing and purifying effect on such oils, and to convert unsaturated compounds therein into saturated. In the stated processes, and in other processes of treating mineral and other oils with aluminum chlorid, the aluminum chlorid after a time loses its activity and forms a sludge or coky residue as the case may be, which, usually, practically completely separates out of the oil on cooling. This residue or sludge probably contains much or most of the aluminum chlorid as such but in a state of combination with other components of such a residue. On heating such a residue, the contained aluminum chlorid does not volatilize readily; in fact, the material may be heated above the normal volatilizing temperature of aluminum chlorid without any great formation of vapors of that substance. I have found, however, that by treating these residues while hot with a comparatively small amount of chlorin, the aluminum chlorid is released from its state of combination (if such it be), and a copious formation of aluminum chlorid vapors takes place. In the present invention, therefore, I take a sludgy or coky residue of the character described which generally contains a considerable amount of adhering oil, and I first substantially free it from this oil. The oil may amount to 50 per cent. or more of the residue and can be recovered by extracting the residue with gasolene or other solvent; but as a rule, I find it more advantageous to remove the oil in another manner. By heating the residue gradually, the adhering oil becomes more fluid, and much or most of it may then be drained off and recovered. In cases where aluminum chlorid has been used in treating oil in a still and the body of oil is finally cooled therein to cause a separation of the oil from the residue, after removal of such oil body the residue may be reheated without removal from the still, and oil liberated by the reheating drained or sucked off in any convenient manner. Or, the residue may be removed from the still and reheated in another vessel. Residual organic bodies, including any small amount of oil which may have remained, are then carbonized by raising the heat. After carbonization, the residue is free of organic impurities. In heating, air and moisture should be carefully excluded. During the carbonization there is usually some evolution of hydrochloric acid gas. The acid gas may be led off and collected or may be led into another charge in a further advanced state of treatment, as hereinafter explained. Up to the point of complete carbonization, and somewhat beyond it, no particular loss of aluminum chlorid need be feared. Even after a complete removal of the oil, the residue on heating generally softens and takes on an asphalt-like consistency prior to complete carbonization. In carbonization the material may be brought to a low red heat. On now bringing a current of chlorin into contact with this hot material a copious evolution of fumes of aluminum chlorid is produced. These fumes may be led off and condensed in a suitable receiver. When the formation of aluminum chlorid vapors ceases, the introduction of chlorin may be discontinued. The residue finally remaining in the apparatus is mostly carbon.

In oil-treating processes where aluminum chlorid is employed, presence of moisture in the oil is carefully avoided, as water breaks up the chlorid with formation of alumina, but in the event of moisture being present or gaining access during or after treatment of the oil with the chlorid and alumina occurring in the residue to be treated under the present invention, this alumina will be converted into aluminum chlorid by the conjoint action of the carbon and chlorin. Where it is desired to add to the amount of aluminum chlorid, a little bauxite or other form of alumina may be conveniently mixed with the carbonaceous residue prior to the introduction of chlorin. The carbon of the residue will serve in connection with the chlorin to produce a further quantity of aluminum chlorid from such bauxite.

In lieu of using chlorin, other chlorin-containing bodies, such as dry HCl gas, may be used. An advantageous and economical operation is afforded by leading the hydrochloric acid gas formed in heating or carbonizing one charge into another charge which has already been carbonized and is ready for the production of aluminum chlorid. The hydrochloric acid gas may be used alone or in admixture with chlorin.

The removal of the oil, the carbonizing and the recovery of aluminum chlorid need not, of course, be effected in one and the same apparatus, but each stage may be, and often advantageously is, performed in a separate vessel under appropriate conditions. This has, for example, the advantage that the aluminum chlorid forming apparatus need not be cooled in introducing a fresh charge. It is of course also possible to perform the operations of the present invention successively on an advancing column or stream of material passing more or less continuously through a suitable apparatus. In using two retorts in series, for example, the material may be merely heated in the first to the temperature necessary to disengage oil, while the second retort is at a higher heat;—a heat sufficient to carbonize or to form aluminum chlorid. Any hydrochloric acid gas given off during the oil liberation in the first retort may be led into the second retort to assist in liberating aluminum chlorid. The heated, oil-freed material from the first retort may be dumped or led into the second retort and there carbonized and the aluminum chlorid recovered.

In the described operation any suitable type of apparatus may be used; as for example, a structure embodying an ordinary clay gas retort vertically placed. This retort should have connections for draining off the oil set free on heating, for discharging vapors and gases, for introducing chlorin and for leading the aluminum chlorid set free and produced to a place of collection. Any ordinary heating means may be adopted but oil firing or gas firing is convenient.

In the accompanying illustration I have shown one form of apparatus of the many adapted for use in the described operation.

In the view, which is a vertical section, element 1 is a retort which may be of clay, silicious material, etc., and is held within a casing or furnace chamber 2, fired at 3 by any suitable means (not shown). Above the retort is an extension 4, having outlet conduit 5 for aluminum chlorid vapors and closed by arch 6, which may carry, as shown, bell-and-cone feed 7. The bell and feed device may be of iron, steel or bronze; but is best protected by a clay or like covering. At the bottom, the retort carries a tapered metal continuation 8 (also preferably lined) with pivoted door 9 for dumping exhausted material. Outlet conduit 10 may be provided for draining off oil and inlet conduit 11 for the introduction of chlorin. The conduit for aluminum chlorid vapors (5) extends past a pair of chambers, 12 and 13, closed below by bottoms, 14 and 15. As shown, these chambers are provided with doors 16 and 17 and with upper removable closures 18 and 19. Outlet 20 may be provided for leading off gases.

The use of this structure is obvious from the foregoing. Aluminum chlorid residues arising from any treatment of any oil or any fat with aluminum chlorid or with materials forming aluminum chlorid may be introduced into chamber 1 by means of the cone feed 7. The heat through 3 is then adjusted so as to warm up the residues sufficiently to cause the oil to flow down. It is tapped off at 10. The heat is now raised until the residual material is thoroughly carbonized; until all the volatile matters which can be expelled by pyrolytic decomposition of hydrocarbons, etc., are expelled and until the mass is thoroughly charred. During this operation the heat may be raised until the mass becomes red hot without fear of loss of aluminum chlorid. After the mass is charred, chlorin is led in through 11 and aluminum chlorid vapors pass out through 5, condensing for the most part in chamber 12. Chamber 13 receives a further condensate of aluminum chlorid. Uncondensed gases pass away through 20. Instead of chlorin, hydrochloric acid or other chlorin-containing gas or vapor may be led in through 11. When the expulsion of aluminum chlorid is finished, the residual mass may be dumped by opening 9. It is better to do this rather than leave it and put another charge of fresh material on top of it, since the porous residual carbon will take up oil. The process may now be repeated.

While for the sake of simplicity of illustration but one retort is shown, of course a plurality of such retorts operating in parallel or in series may be used. Other condensing arrangements may be substituted for those shown, but the chambers shown are simple and convenient.

In case it is desired to form new aluminum chlorid in addition to that to be recovered, this can be easily accomplished, as stated, by mixing a little bauxite, or other form of alumina, with the residue prior to placing in the retort. The addition of aluminum chips or shavings is more expensive but can be practised. There is usually enough carbon in the carbonized mass to convert considerable alumina.

What I claim is:—

1. The process of recovering aluminum chlorid from oily residues which comprises removing oil from such residues, heating to carbonize and contacting chlorin therewith.

2. The process of recovering aluminum chlorid from oily residues which comprises heating such residue to a carbonizing temperature and contacting chlorin therewith.

3. The process of recovering aluminum chlorid from oily residues which comprises removing oil from such residues, heating to carbonize and contacting a gas containing chlorin therewith.

4. The process of recovering aluminum chlorid from oily residues which comprises heating such residue to a carbonizing temperature and contacting a gas containing chlorin therewith.

5. The process of recovering aluminum chlorid from the residues formed in the treatment of petroleum oils therewith which comprises heating such residues to remove oil, heating the oil-freed residue to carbonize organic matter and treating the carbonized residues with a gas containing chlorin.

6. The process of recovering aluminum chlorid from the residues formed in the treatment of petroleum oils therewith which comprises heating such residues to remove oil, heating the oil-freed residue to carbonize organic matter and treating the carbonized residues with chlorin.

7. The process of recovering aluminum chlorid from residues formed in the treatment of petroleum oils therewith which comprises heating such a residue to a temperature at which contained oil will drain off, draining off such oil, raising the temperature of the material to a red heat and contacting chlorid with the hot material.

In testimony whereof, I affix my signature in the presence of two subscribing witnesses.

ALMER McDUFFIE McAFEE.

Witnesses:
F. J. K. HAUXHURST,
JULIA M. McCABE.

It is hereby certified that in Letters Patent No. 1,099,096, granted June 2, 1914, upon the application of Almer McDuffie McAfee, of Bayonne, New Jersey, for an improvement in "The Manufacture of Aluminum Chlorid," errors appear in the printed specification requiring correction as follows: Page 3, line 61, for the word "chlorid" read *chlorin;* and the name of the first-mentioned witness to the signature of the patentee at the end of the specification, for "F. J. K. Hauxburst" read *T. S. K. Hawxhurst;* and that the said Letters Patent should be read with these corrections therein that the same may conform to the record of the case in the Patent Office.

Signed and sealed this 23rd day of June, A. D., 1914.

[SEAL.]
R. F. WHITEHEAD,
*Acting Commissioner of Patents.*